Oct. 11, 1932.  R. W. JOHNSON  1,881,638
THERMOSTAT ASSEMBLY
Filed Sept. 2, 1930   2 Sheets-Sheet 1
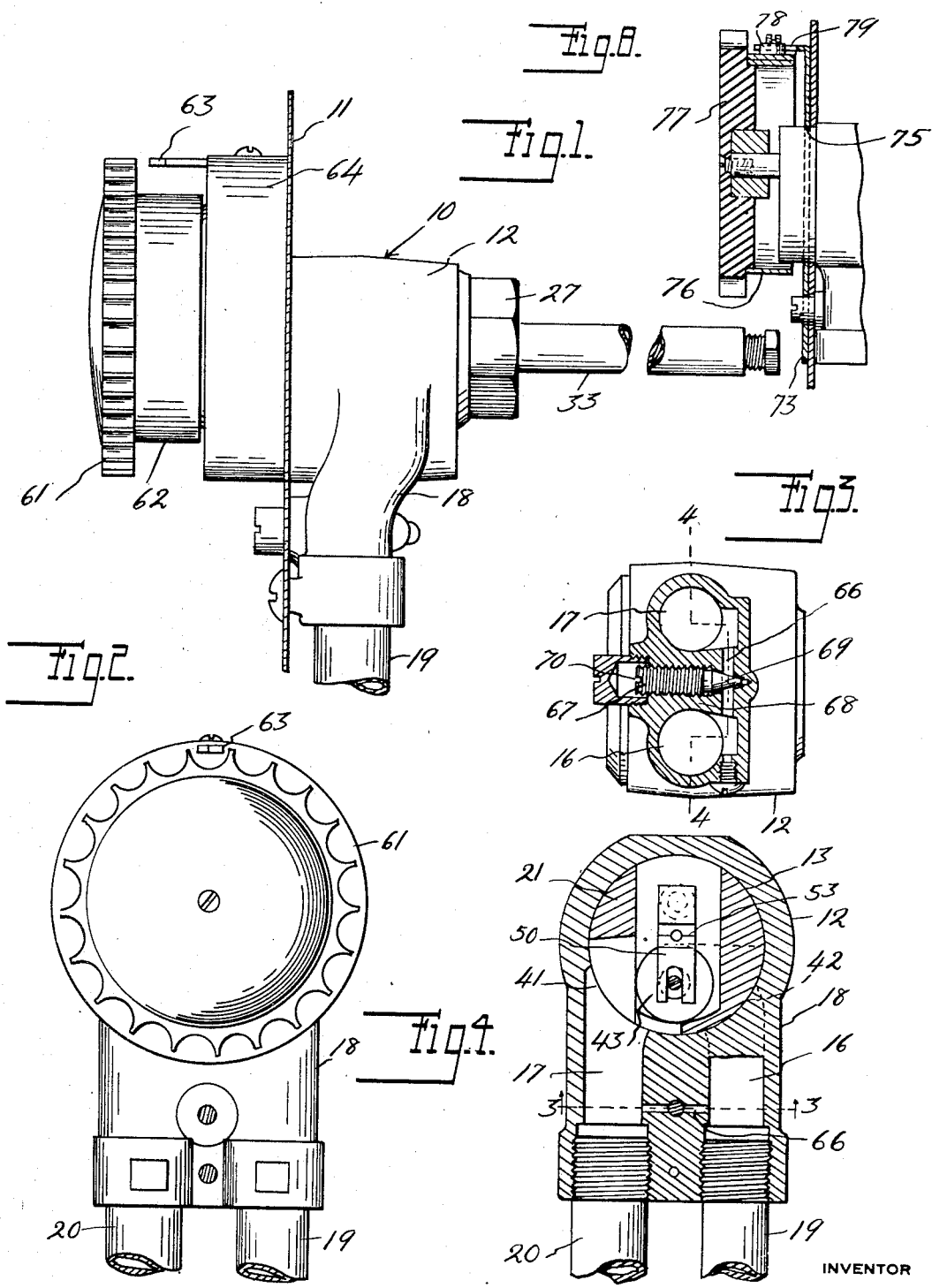
INVENTOR
Roy W. Johnson
BY
Whittemore, Hulbert, Whittemore & Belknap
ATTORNEYS Oct. 11, 1932.  R. W. JOHNSON  1,881,638
THERMOSTAT ASSEMBLY
Filed Sept. 2, 1930   2 Sheets-Sheet 2
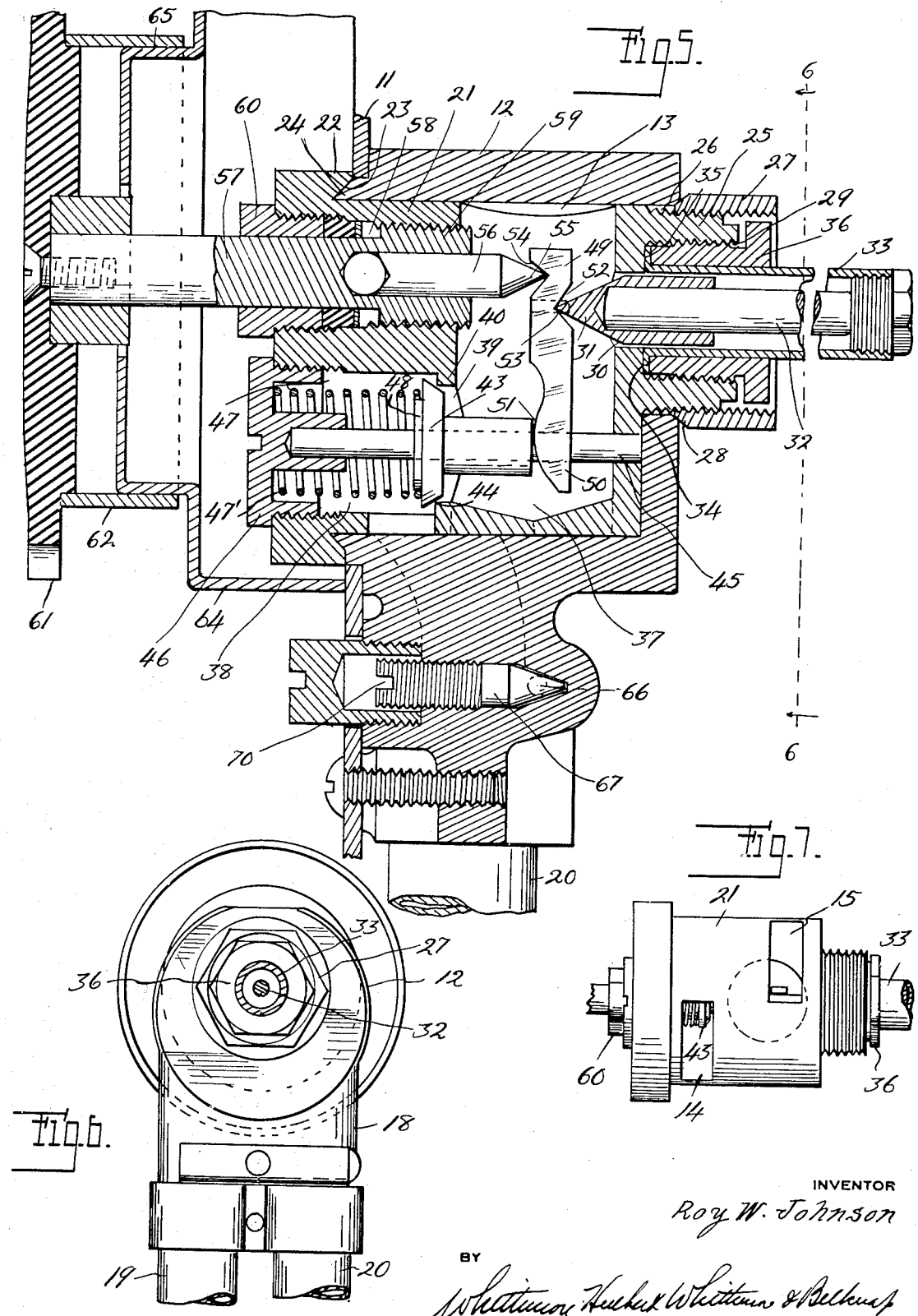
INVENTOR
Roy W. Johnson
BY
Whittemore Hulbert Whittemore & Belknap
ATTORNEYS Patented Oct. 11, 1932

1,881,638

UNITED STATES PATENT OFFICE

ROY W. JOHNSON, OF ELKHART, INDIANA, ASSIGNOR TO ROBERTS BRASS MANUFACTURING COMPANY, OF DETROIT, MICHIGAN, A CORPORATION OF MICHIGAN

THERMOSTAT ASSEMBLY

Application filed September 2, 1930. Serial No. 479,301.

This invention relates to automatic control devices and has particular reference to temperature regulating mechanism.

The invention, while capable of many diversified uses, finds particular utility when used in connection with heating devices such as ovens and the like for regulating the temperature thereof and to this end the invention consists in the provision of improved temperature responsive regulating mechanism capable of maintaining the device with which it is associated at accurate predetermined temperatures.

An object of this invention is to provide temperature responsive mechanism of the type set forth above which is both simple and durable in construction and which forms a unit in itself and may be readily assembled and economically manufactured.

Other objects of the invention reside in the peculiar construction of the temperature regulating mechanism and the efficient manner in which the same operates to maintain the device with which it is associated at accurate predetermined temperatures. The foregoing objects as well as other advantageous features of the present invention will be made more apparent as this description proceeds, especially when considered in connection with the accompanying drawings, wherein:

Figure 1 is a side elevational view of a temperature regulating device constructed in accordance with this invention.

Figure 2 is an end elevational view of the construction shown in Figure 1.

Figure 3 is a sectional view taken on the line 3—3 of Figure 4.

Figure 4 is a sectional view taken on the plane indicated by the line 4—4 of Figure 3.

Figure 5 is a longitudinal sectional view through the construction shown in Figure 1.

Figure 6 is a sectional view taken on the line 6—6 of Figure 5.

Figure 7 is a fragmentary bottom plan view of the casing for the regulating mechanism.

Figure 8 is a fragmentary sectional view illustrating a slightly modified form of construction.

Referring now to the drawings, it will be noted that I have illustrated in Figure 1 a regulating device 10 constructed in accordance with this invention and arranged to be secured to a support 11 which, for the purpose of illustration, will be hereinafter referred to as one wall of a suitable oven, the interior of which is maintained at accurate predetermined temperatures by the device 10. In detail, the regulating device comprises a housing 12 having a tubular body portion 13 formed with laterally and circumferentially spaced openings 14 and 15 in the bottom wall thereof communicating with suitable downwardly extending spaced passages 16 and 17, respectively. The passages 16 and 17 are formed in an extension 18 of the housing and are adapted to communicate with the fluid supply and distributing conduits 19 and 20, respectively. When the device is used in connection with an oven, the supply conduit 19 preferably communicates with a fuel reservoir while the distributing conduit 20 communicates with a suitable burner within the oven for supplying fuel thereto. In this connection it should be understood that in some cases the above arrangement may be reversed in that the conduit 20 may be utilized as a supply line while the conduit 19 functions as the distributing line.

Sleeved within the tubular portion 13 of the housing is a tubular casing 21 having a radially projecting annular shoulder 22 upon the outer end thereof undercut as illustrated by the reference character 23 to form a tapered seat for the correspondingly shaped end portion 24 of the housing 12. The opposite end of the casing is provided with a tubular threaded extension 25 arranged eccentrically relative to the axis of the casing and adapted to extend through an opening 26 formed in the inner end wall of the housing. The projecting end of the extension 25 is adapted to be engaged by a tubular nut 27 having an annular seat portion 28 engageable with the portions of the wall of the housing surrounding the opening 26 for clamping the casing and housing in assembled relation. As will be observed from Figure 5 of the drawings, the extension is also provided with a threaded recess 29 communicating with the interior of the casing 21 by means of a restricted opening 30. The opening 30 is of sufficient diameter to freely receive the end portion 31 of one of the thermostatic elements 32. The cooperating thermostatic element is in the form of a sleeve 33 surrounding the element 32 and having the outer end portion extending within the recess 29 and terminating in a radial flange 34 engageable with the end wall 35 of the recess. The tubular thermostatic element 33 is rigidly held in assembled relation with the casing by means of a suitable nut 36 threadedly engaging the recess 29 and having a portion engageable with the radial flange 34 for clamping the same to the end wall 35 of the recess. Both of the thermostatic elements 32 and 33 are arranged entirely within the oven and are formed of materials having different thermo coefficients of expansion with the result that slight variations in oven temperature causes a movement of the elements relative to each other.

As will be further observed from Figure 5 of the drawings, the casing 21 is provided with laterally spaced chambers 37 and 38 adapted to communicate with each other through a suitable opening 39 formed in the partition 40 between the two chambers. The two chambers 37 and 38 also communicate with the supply and distributing conduits 16 and 17, respectively, through suitable openings 41 and 42 formed in the bottom walls thereof and adapted to register with the openings 14 and 15 in the bottom wall of the housing 12. Thus from the foregoing it will be observed that the fuel from the reservoir (not shown) is permitted to flow through the conduit 19 and passage 16 into the chamber 37 and through the opening 39 into the chamber 38 and through the passage 17 into the distributing conduit 20.

In order to control the flow of fuel from the supply conduit to the distributing conduit, I provide a valve member 43 within the chamber 38 and adapted to seat on the peripheral portions 44 of the opening 39. The valve member is slidably mounted upon a shaft 45 having its axis arranged substantially parallel to the axis of the casing and having the inner end thereof secured to the inner end wall of the casing and the outer end thereof supported by a suitable adjustable element 46 threadedly engaging an opening 47 in the front wall of the chamber 38. The valve member 43 is normally urged toward its seat 44 by means of a suitable coil spring 47′ having one end surrounding a shoulder 48 on the valve member and the opposite end engaging the adjustable element 46.

In order to automatically actuate the valve member 43 to regulate the flow of fuel from the supply conduit to the distributing conduit in accordance with the temperature variations in the oven, I provide a lever 49 having a bifurcated portion 50 at the lower end thereof with the furcations thereof arranged upon opposite sides of the shaft 45 and having cam surfaces 51 adapted to engage the rear end of the valve member 43. The upper portion of the lever is formed with a V-shaped notch 52 in the inner edge thereof engageable with a knife edge 53 formed on the outer end of the thermostatic element 31. The front edge of the upper portion of the lever is also provided with a V-shaped notch 54 arranged above the notch 52 and adapted to cooperate with a second knife edge 55 to form a fulcrum for the lever. The second knife edge 55 is formed upon the inner end of a rod 56 having the outer end portions thereof arranged within a suitable recess formed in the inner end portion of an adjustable element 57. The adjustable element 57 is adapted to extend through an opening 58 formed in the casing 21 and is provided with an enlarged head portion 59 threadedly engaging the inner end portions of said opening.

The central portion of the element 57 is supported by a bushing 60 threadedly engaging the outer portions of the opening 58. Secured to the extreme outer end of the element 57 is a suitable hand engaging wheel 61 provided with an inwardly extending annular flange 62 having suitable indicia thereon cooperating with a pointer 63 secured to and extending forwardly from a suitable cap member 64. The cap member 64 is adapted to conceal the portions of the regulating mechanism projecting through the oven wall 11 and is secured to the front wall of the casing 21 in any suitable manner. As shown particularly in Figure 5, the cap member 64 is provided with a reduced annular hub portion 65 adapted to extend within the annular flange 62.

The above construction is such that rotation of the hand wheel 61 causes an axial movement of the element 57 and rod 56 to effect a rocking movement of the valve actuating lever 49 about the knife edge 53 formed on the end 31 of the thermostatic element 32. Rocking movement of the lever 49 effects an actuation of the valve member 43 to control communication between the chambers 37 and 38. It will be observed that actuation of the valve by the manual adjustable mechanism, hereinbefore set forth, causes the lever 49 to fulcrum about the knife edge 53 on the thermostatic element 32 while actuation of the valve by the thermostatic means 32 and 33 causes the lever 49 to fulcrum about the knife edge 55 on the manual adjustable element 56.

As shown in Figures 3 and 4, I provide means for by-passing a limited amount of fluid from the supply passage 16 to the distributing passage 17 irrespective of the position of the valve member 43. The foregoing means comprises a passage 66 extending transversely of the extension 18 and communicating with both the supply and distributing passages 16 and 17. The quantity of fuel by-passed from the supply to the distributing conduit through the passage 66 may be accurately varied by means of a valve member 67 threadedly engaging the extension 18 intermediate the passages 16 and 17 and having a portion 69 arranged to project into the central portion of the passage 66. As shown more particularly in Figure 5, the valve member 67 is accessible for manual operation from a point exteriorly of the oven wall 11 and is slotted as at 70 to receive a suitable tool (not shown). With the above construction it is possible to maintain a low flame or pilot at the burner within the oven irrespective of the position of the valve member 43 for controlling the flow of fuel to the burner.

Referring now to the operation of the regulating device, as described above, and assuming that it is desired to obtain a temperature within the oven of, for example, 400° and that the valve member 43 is in the position illustrated in Figure 5, the hand wheel 61 is rotated to register the numerals 400 appearing on the flange of the wheel with the pointer 63. Rotation of the hand wheel, as set forth above, causes an axial inward movement of the adjustable element 57 with the result that the lever 49 is rocked about the fulcrum 53 to engage the cam portion 51 of the lever with the valve member 43 to force the same outwardly away from its seat 44 against the action of the spring 47'. Movement of the valve member 43 away from its seat permits the fuel to flow from the supply chamber 37 into the distributing chamber 38 which, as pointed out above, communicates with the oven burners. The velocity of flow of the fuel depending upon the distance the valve member 43 is moved away from its seat 44 which in turn depends upon the angular movement of the hand wheel 61.

The valve member 43 remains in the open position, set forth above, until the temperature within the oven exceeds the amount indicated by the pointer or, in the present case, rises above 400°. As the oven is approaching the predetermined temperature, the thermostatic unit including the element 32 gradually expands with the result that the knife edge or fulcrum 53 moves inwardly permitting the spring 47' to move the valve member 43 toward its closed position and to rock the lever 49 in the opposite direction about the knife edge or fulcrum 55. Movement of the valve member 43, as specified above, diminishes the supply of fuel flowing to the burners and prevents the oven temperature from exceeding the predetermined amount. As the temperature in the oven drops below the predetermined amount the thermostatic unit will contract and rock the lever 49 about the knife edge or fulcrum 55 to again open the valve a sufficient distance to permit a sufficient quantity of fuel to enter the distributing chamber 38 to raise the temperature within the oven to the desired amount.

The modified construction illustrated in Figure 8 differs from the construction previously described in that a plate 73 is secured to the oven wall and is formed with an opening 75 of sufficient dimension to permit portions of the thermostatic mechanism shown in the above figure to pass therethrough into the ring 76 carried by the hand wheel 77. The ring 76 is preferably formed by bending a strip of metal to form an annulus and securing the ends of the strip together by means of a securing element 78. The element 78 in addition to performing the above function, also operates as a stop for engaging a pointer 79 formed on the plate 73 and extending over the ring 76. The pointer 79 is adapted to register with suitable indicia preferably applied to the outer surface of the ring 76 in a position to be readily visible by the operator.

Thus, from the foregoing it will be observed that I have provided a simple and efficient temperature regulating device which forms a unitary and compact construction and which may be manufactured and assembled expediently and economically. It will further be observed that I have provided a temperature regulating device which, when used in connection with ovens, is substantially arranged within the oven and, as a consequence, is more sensitive to temperature variations in the oven and provides a neater and more pleasing design. Moreover, as will be apparent from the above description the construction is such as to permit removing the housing 21 and as a consequence, the mechanism associated therewith from the casing 12 as a unit.

What I claim as my invention is:

1. A temperature regulating device comprising a housing having spaced openings therein communicating with a fluid supply and distributing line, a casing removably positioned within the housing having portions communicating with the openings aforesaid in the housing and with each other, valve means carried by the casing and controlling communication between the portions aforesaid thereof, and means also carried by said casing for automatically and manually controlling the operation of said valve means.

2. A temperature regulating device for ovens and the like comprising a housing disposed within the oven and having an opening therein communicating with a corresponding opening in one side wall of the oven, fluid supply and distributing lines arranged within the oven and communicating with the housing, a casing removably positioned within the opening aforesaid in the housing from a point exteriorly of the oven and having spaced chambers therein communicating with the fluid supply and distributing lines and with each other, valve means carried by the casing controlling communication between the chambers aforesaid therein, and means also carried by said casing for actuating said valve means.

3. A temperature regulating device comprising a housing having a tubular portion formed with spaced passages therein communicating with a source of fluid supply and with the point of distribution respectively, a tubular casing removably sleeved within the tubular portion of the housing and having spaced chambers therein communicating with the passages aforesaid and with each other, valve means carried by said casing controlling communication between said chambers for regulating the flow of fluid from the source of supply to the point of distribution, and means also carried by said casing for controlling the operation of said valve.

4. A temperature regulating device for ovens comprising, a housing arranged substantially within the oven having a tubular portion provided with an extension formed with laterally spaced passages therein communicating respectively with a source of fluid supply and with a burner, a tubular casing removably positioned within the tubular portion of the housing and having spaced chambers therein communicating respectively with the passages aforesaid and with each other, valve means carried by said casing controlling communication between said chambers for regulating the flow of fluid from one of the aforesaid passages to the other, temperature responsive means for controlling the operation of said valve, and means arranged within said extension and operable for by-passing a limited quantity of fluid from one passage to the other irrespective of the position of said valve means.

5. A temperature regulating device comprising a housing having a tubular portion provided with an extension formed with spaced passages therein communicating respectively with a source of fluid supply and with the point of distribution for the fluid, a tubular casing removably positioned within the tubular portion of the housing and having spaced chambers therein communicating with the passages aforesaid and with each other, valve means carried by said casing controlling communication between the chambers for regulating the flow of fluid from one passage to the other, temperature responsive mechanism for controlling the operation of said valve, means arranged within the extension for by-passing a limited quantity of fluid from one passage to the other irrespective of the position of said valve means, said last-mentioned means including a transverse passage within the extension communicating with the passages aforesaid, and a valve member also arranged within said extension and operable to vary the quantity of fluid by-passed.

6. A temperature regulating device comprising a housing, a casing removably positioned within the housing and communicating with a fluid supply and distributing line, valve means arranged within the casing and carried thereby for controlling the flow of fluid from the supply to the distributing line, automatic means responsive to temperature variations and manually operable means for controlling the operation of said valve, said valve means, manual and automatic means forming a unit with said casing and removable therewith as a unit from said housing.

7. In a temperature regulating device, a housing constructed to lie substantially flat against the inner side of an oven wall and having spaced fluid passages, a cap member attachable to the outer side of the oven wall, a casing extending transversely of the housing and having spaced chambers respectively communicating with each other and with the passages aforesaid, and means for controlling the flow of fluid from one chamber to the other including a valve in one of said chambers, and actuating means for the valve projecting from opposite ends of the casing, one of the actuating means including a longitudinally movable element movable in substantially aligned openings in the oven wall and cap member, and an operating handle secured to said element upon the outer side of said cap member.

8. In a temperature regulating device, a housing attachable to the inner side of an oven wall and having laterally spaced fluid passages, a casing within the housing and having spaced chambers respectively communicating with the passages and with each other, and means for regulating the flow of fluid from one chamber to the other including a valve in one chamber, a manually operable member projecting from one end of the casing so as to be accessible from the outer side of an oven, a temperature responsive member projecting from the other end of the casing for use within an oven, and actuating means for the valve alternately operable by said members.

9. In a temperature regulating device, a housing attachable to the inner side of an open wall and having laterally spaced fluid passages, a casing within the housing and having spaced chambers respectively communicating with the passages and with each other, and means for regulating the flow of fluid from one chamber to the other including a valve in one chamber, a manually operable member projecting from one end of the casing so as to be accessible from the outer side of an oven, a temperature responsive member projecting from the other end of the casing for use within an oven, and actuating means for the valve including an element bearing against both said members whereby each may constitute a fulcrum for the element.

10. In a temperature regulating device, a housing constructed to lie substantially flat against the inner side of an oven wall and having spaced fluid passages and a by pass extending between said passages, a casing within the housing and having spaced chambers respectively communicating with the spaced passages and with each other, means controlling the flow of fluid from one chamber to the other, and means controlling the flow of fluid through the by pass, including a valve extending transversely of the housing and accessible through the oven wall from the outer side of the latter.

In testimony whereof I affix my signature.

ROY W. JOHNSON.